March 2, 1926.
J. M. MILLER
AUTOMATIC SIGNAL
Filed Feb. 13, 1922   2 Sheets-Sheet 1
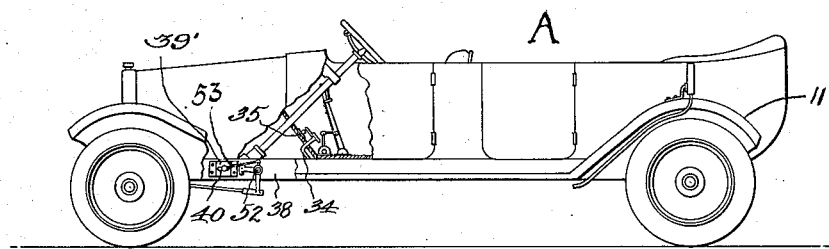
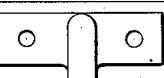
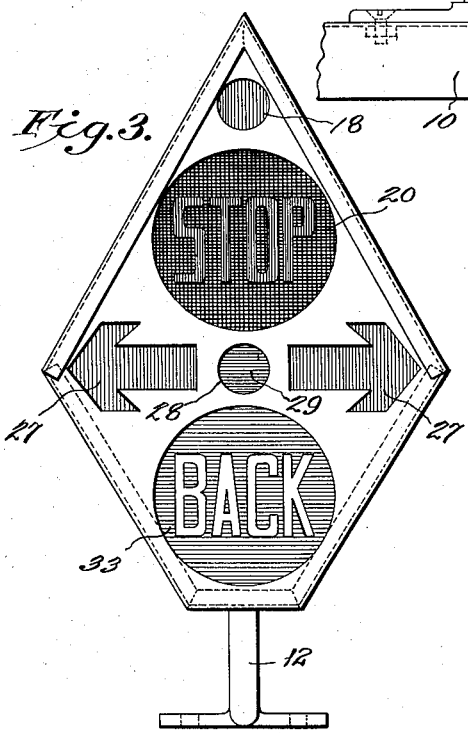
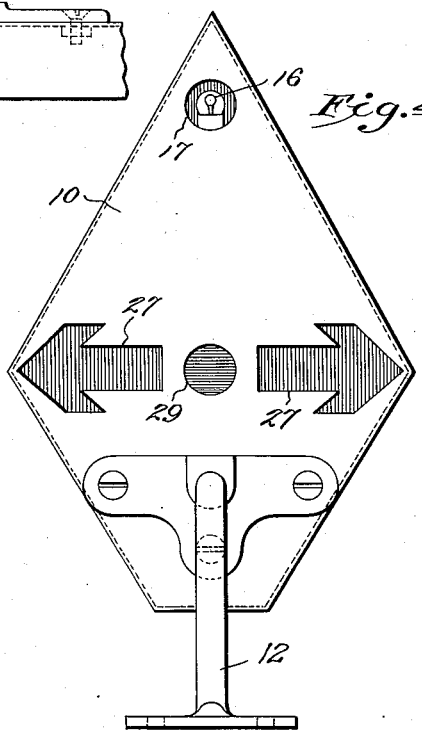
J. M. Miller
INVENTOR
BY Victor J. Evans
ATTORNEY
WITNESSES March 2, 1926.
J. M. MILLER
AUTOMATIC SIGNAL
1,575,445
Filed Feb. 13, 1922
2 Sheets-Sheet 2
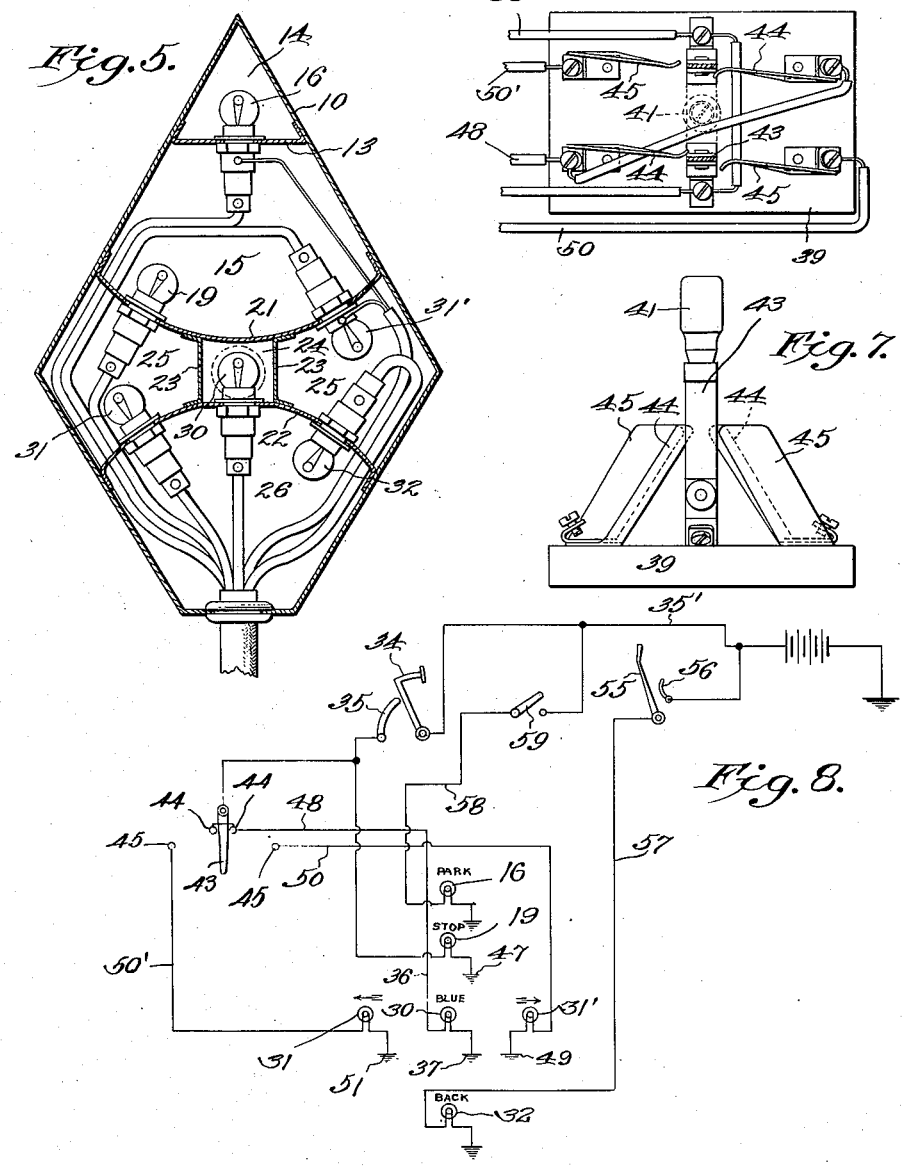
J. M. Miller
INVENTOR
BY Victor J. Evans
ATTORNEY Patented Mar. 2, 1926.

1,575,445

UNITED STATES PATENT OFFICE.

JAMES M. MILLER, OF WASHINGTON, DISTRICT OF COLUMBIA, ASSIGNOR TO MILLER AUTOMATIC SIGNAL LIGHT COMPANY, OF WASHINGTON, DISTRICT OF COLUMBIA, A CORPORATION OF DELAWARE.

AUTOMATIC SIGNAL.

Application filed February 13, 1922. Serial No. 536,265.

*To all whom it may concern:*

Be it known that I, JAMES M. MILLER, a citizen of the United States, residing at Washington, District of Columbia, have invented new and useful Improvements in Automatic Signals, of which the following is a specification.

This invention has reference to direction signals for motor operated vehicles, and has for one of its chief characteristics, the provision of a casing adapted to be mounted at the rear of the vehicle, and constructed to provide a plurality of separate compartments, each of which contains an electric light bulb, the rear wall of the casing being provided with the legends "Stop", and "Back", and is further designed to include arrows projecting both to the right and to the left, and between which arrows is a central compartment, the electric light bulbs being selectively illuminated, so as to indicate to pedestrians and the drivers of other vehicles, the intention of the driver of the particular vehicle, so equipped as to whether he intends to turn to the right, or left, or to bring his vehicle to a stop, or incidently move his car in a reverse direction.

Another important object of the invention resides in the construction of means for selectively illuminating the compartments above referred to, the central compartment being illuminated incident to a slight depression on the brake pedal, plus a slight turn of the steering wheel for the purpose of warning the drivers of other vehicles, that one of the other compartments is about to be illuminated to indicate the intentions of the driver of said vehicle with regard to the direction which he intends to pursue, or whether he intends to bring his vehicle to a stop, or if standing, whether or not he intends to reverse; the various compartments, with the exception of the last two mentioned compartments being automatically illuminated incident to the steering of the vehicle, while the compartment which indicates the intention of the driver to reverse the vehicle is illuminated incident to the operation of the gear shift lever in the proper direction.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a side elevation of a motor operated vehicle illustrating the application of the invention.

Figure 2 is a detail view of the bracket.

Figure 3 is a view in elevation looking at the rear of the signal casing.

Figure 4 is a similar view looking at the front of said casing.

Figure 5 is a view showing the interior of the casing and the arrangement of the different compartments.

Figure 6 is a plan view of the switch.

Figure 7 is a side elevation of the switch.

Figure 8 is a diagrammatic view of the system.

Referring to the drawings in detail, A indicates generally a motor operated vehicle of any well known construction, and upon the rear fender 11 is mounted a casing 10. It is of course to be understood that this casing may be mounted on any other appropriate part of the vehicle, but it is preferably arranged upon the rear fender so that it can be viewed from either end of the vehicle.

The casing 10 is supported by means of a bracket 12 of any suitable construction. The casing 10 may vary in size and configuration without departing from the spirit of the invention, but is preferably of diamond shape in plan in order that the various compartments above referred to can be conveniently arranged for their specific purposes. As illustrated in Figure 5, the casing is divided by a partition 13 to define a compartment 14 and a compartment 15, the compartment 14 having arranged therein an electric light bulb 16 which is used for parking purposes. The front and rear walls of the casing 10 are provided with alined openings 17 and 18 respectively so that this bulb may be viewed from either side of the signal. Arranged within the compartment 15 is an electric light bulb 19 for the purpose of illuminating this compartment as the occasion requires. The rear wall of the casing is provided with an enlarged sight opening which is covered by a piece of transparent material 20, upon which is arranged the word "Stop", so that when the compartment 15 is illuminated, the drivers of other vehicles will be informed of the fact that it is the intention of the driver of the particular machine so equipped with the invention to bring his car to a stop. Also arranged within the casing 10 are oppositely curved partitions 21 and 22 respectively which are connected by spaced parallel members 23, thus dividing the casing into a central compartment 24 and compartments 25 arranged at either side of the central compartment 24, and an additional end compartment 26. A portion of the rear and front walls of the casing is cut away to provide oppositely arranged arrows 27 which are arranged directly in a line with the compartments 25, so that when either of these compartments is illuminated, the particular arrow by reason of its arrangement upon said walls will indicate to others, the direction the machine is about to pursue. The opposed walls of this casing are further provided with openings 28 which are arranged centrally of said walls between the arrows 27, and these openings 28 are arranged directly in line with the central compartment 24. The openings 28 are covered by transparent members 29 preferably blue in color, and it is the purpose to illuminate this central compartment prior to illuminating any other compartment, so as to inform others that the signal will be subsequently operated to indicate the intentions of the driver of the vehicle as above pointed out. Manifestly, the compartment 24 has arranged therein an electric light bulb 30, while similar bulbs 31' are arranged in the compartment 25. Another bulb 32 is arranged in the compartment 26 to illuminate the latter for the purpose of indicating to others, that the driver of the vehicle is about to move the machine in a reverse or backward direction, and this information is conveyed through the instrumentality of a transparent member 33 which is arranged to cover an opening in the rear wall of the casing 10, and which member has arranged thereon the word "Back" as clearly illustrated in Figure 3. It will be noted that the signal in its entirety can be read or viewed from either end of the machine.

As above stated, the compartments are selectively illuminated for the various purposes described, and the bulbs arranged in said compartments are connected in circuits which are energized from the battery of the vehicle A. A diagrammatic view of the system is illustrated in Figure 8. However, these circuits are controlled in several ways, for an efficient operation of the invention in its entirety, and it will be noted that with the exception of the compartment 14 and the compartment 26, the other compartments are illuminated incident to the steering of the vehicle. Manifestly, the signal is thus operated without requiring any attention of the operator, so that he may devote his attention to the operation and guidance of the machine. It is necessary however, to first illuminate the compartment 24 in order to selectively illuminate the other compartments incident to the steering of the vehicle, and this compartment 24 is illuminated incident to a slight depression on the brake pedal 34, and a slight turn of the steering wheel in either direction, which of course is necessary to steer the vehicle. However, this turning of the wheel is very slight, and is equivalent to taking up the necessary play of said wheel, prior to actuating the steering mechanism. A switch to be hereinafter described is operated by turning said wheel, thereby closing the circuit, through the brake pedal to the compartment 24. But when the brake pedal is depressed, it closes the circuit to the compartment 15 independently of any turn of the steering wheel, so that the "stop" signal is then brought into use. As illustrated in Figure 8, the current for this purpose flows through the wire 35' from the source of energy, then through the brake pedal 34, fixed contact 35, and thence to the bulb in the stop compartment 15.

Supported upon one side of the chassis 38 of the vehicle is a switch including a casing 39', the side of which is slotted as, at 40 to permit of movement of the switch element 41. This element includes spaced members 43 which co-operate with the contacts at the opposed sides thereof in order to selectively illuminate the compartments for the purpose above mentioned. For instance, at each side of the base 39 of the switch element there is arranged a pair of yieldable contacts indicated at 44 and 45 respectively, and the contacts 44 of each pair are slightly longer than the other contact 45 thereof. Consequently, when the switch element is moved in either direction, one of its members 43 is brought initially into engagement with the contact 44 of one or the other pair of yieldable contacts, so that the bulb 30 in the compartment 24 is lighted just prior to a contact being made between the other member 43 of the switch element and the remaining contact 45, which of course illuminates one of the compartments 25, depending upon the direction in which the vehicle is turned. As shown in Figure 8, the current passes through the wire 35', brake pedal 34, contact 35, through the switch just described, and thence through the wire 48 to the bulb 30 from where it is grounded as at 37. Now, when the switch element 41 is shifted incident to taking up the play or loss motion in the steering wheel, and thereby closing the circuit through the bulb 30, upon further movement of the element 41 in the same direction, incident to the steering of the vehicle, the switch element is brought into engagement with the adjacent contact 45 of the same pair of contacts, thereby illuminating the bulb 31 or 31' in either the right or left compartment 25 depending upon which direction the vehicle is turned, thus the arrow at this side of the casing is illuminated which indicates to others that the driver is about to turn in this direction. As illustrated in Figure 8, when the compartment 25 at the right of the casing is illuminated, the current flows through the wire 35' from the source of energy, brake pedal 34, fixed contact 35, through the switch just described closing the circuit to the central compartment 24 first, and then flowing through the wire 50 to the particular compartment 25, from where it is grounded as at 49. The compartment at the left is illuminated in the same manner, except that the current passes through the wire 50' and is grounded at 51. It might here be stated that the arrows at the right of the casing are covered with transparent material, preferably red, while the arrows at the left of the casing are similarly covered by transparent material, preferably blue. The switch element 41 is connected with the shaft 52 forming part of the steering mechanism of the vehicle through the instrumentality of a rod 53, so that the switch element is properly controlled incident to the steering of the vehicle.

It is to be further understood that when the brake pedal 34 is depressed to illuminate the compartment 24, prior to the illumination of any other of the compartments selectively, the brakes of the vehicle are not applied, or in any way effected, as the pedal is merely depressed slightly, which movement is permitted by the lost motion which these pedals generally have.

The bulb 32 in the compartment 26 is lighted when the gear shift lever 55 is moved in a direction to place the car in reverse gear, and when the vehicle occupies this position, it engages the contact 56, closing the circuit 57 to the bulb 32. Thus the word "Back," is illuminated so that the drivers of other vehicles will be informed of the fact, that the vehicle is about to move in a reverse direction.

The compartment 14 is illuminated when the bulb 16 is lighted, the latter being used in the capacity of a parking lamp, and the circuit 58 to this bulb is independently controlled by means of a switch 59.

In practice, when the vehicle is in motion, it is only necessary to depress the brake pedal 34 to move it into engagement with the contact 35, thereby closing the circuit to the bulb in the compartment 24, through the switch actuated by the steering wheel in the manner above set forth and when this compartment is illuminated, it affords evidence of the fact that the operator of the vehicle is about to change his course, or otherwise bring his vehicle to a stop which will be subsequently indicated by the signal. Upon depression of the brake pedal, the compartment 15 and the word "Stop" is illuminated, so that the drivers of other vehicles will check up on their speed with a view of avoiding accidents. This obviously will allow the driver of the particular vehicle equipped with the signal to make a turn either to the left or the right, and the course which he is about to pursue is clearly indicated by one of the arrows 27 at either side of the casing, which are automatically illuminated upon further movement of the steering wheel. The compartments 14, 15 and 26 respectively are illuminated independently of the steering mechanism as above described.

It is to be understood, that the selective illumination of any of the compartments, except the compartments 14, 15 and 26, is in reality controlled by the brake pedal, inasmuch as the bulbs in these compartments cannot be illuminated until the said pedal is moved into engagement with the contact 35, and this is true irrespective of the position of the switch element 41. For instance, in the day time, or under any other circumstances where it is not necessary to resort to the use of the signal, the vehicle may be steered, or in other words guided around corners and circle without illuminating any of the compartments. While the switch is operated under these conditions, the compartment cannot be illuminated until the pedal is depressed. Manifestly when the signal is in operation and the compartment or compartments illuminated, a release of the pedal will extinguish the bulbs, before the turn is completed and the switch elements still in an operative position. Again, when the machine is at a stand-still, and just prior to putting the machine in motion, the front wheels can be turned in the proper direction at an angle to the running gear for the purpose of moving the switch element 41 into an operative position, and then by working the brake pedal up and down in quick order, the various bulbs embodied in the signal is caused to flash or flicker, so as to notify those behind the machine that the driver is about to put the machine in motion. This is very important as many accidents are caused by the vehicles pulling away from a curbing or the like without giving any warning to the approaching vehicles.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. A signal for motor vehicles comprising a controlling element operated from the brake mechanism of the vehicle, electrically operated right and left directions signals included in normally open circuits, a switch arranged in said circuits, means operated from said controlling element for closing said switch, and a switch mechanism actuated from the steering mechanism of the vehicle for completing the circuit through the first mentioned switch to selectively operate the direction signals for the purpose specified.

2. A signal for motor vehicles comprising a controlling element operated from the brake mechanism of the vehicle, electrically operated right and left direction signals and a stop signal each included in normally open circuits, a switch arranged in said circuits, means operated from said controlling element for closing said switch to complete a circuit to the stop signal, and a switching mechanism operated from the steering mechanism of the vehicle for selectively completing another circuit through the first mentioned switch to provide for the operation of a selected signal.

3. A signal for motor vehicles comprising a controlling element operated from the brake mechanism of the vehicle, electrically operated right and left direction signals and an advance signal each included in a normally open circuit, a switch arranged in said circuits, means operated from said controlling element for closing said switch, and a switching mechanism operated from the steering mechanism of the vehicle when the first mentioned switch is closed for selectively operating a direction signal and the advance signal and with the operation of the advance signal before the operation of the direction signal.

4. A signal for motor vehicles comprising a controlling element operated from the brake mechanism of the vehicle, electrically operated right and left direction signals, a stop signal, an advance signal, each of said signals included in normally open circuits, a switch arranged in said circuits, means operated from the controlling element for closing said switch to complete a circuit to said stop signal, and a switching mechanism actuated from and upon the initial movement of the steering mechanism of the vehicle for completing a circuit through the first mentioned switch to the advance signal and further acting to complete an additional circuit to selectively operate a direction signal.

5. In a direction indicating signal for motor vehicles, a controlling element, electrically operated right and left turn signals, a multiple contact switch including a movable element adapted to be operated from the steering mechanism of the vehicle and further including separate contacts electrically connected to the respective turn signals, a source of current, a switch device operated by said controlling element and connected to said source of current, means for connecting one pole of said source of current to each of said signals, and means for connecting said switch device to the other pole of said source and in series with the multiple contact switch whereby the turn signals may be selectively operated.

In testimony whereof I affix my signature.

JAMES M. MILLER.